United States Patent [19]
Yuda

[11] Patent Number: 5,333,536
[45] Date of Patent: Aug. 2, 1994

[54] PISTON AND METHOD OF MANUFACTURE

[76] Inventor: Lawrence F. Yuda, P.O. Box 499, Westminster, S.C. 29693

[21] Appl. No.: 873,666

[22] Filed: Apr. 23, 1992

Related U.S. Application Data

[63] Continuation of Ser. No. 568,223, Aug. 16, 1990.

[51] Int. Cl.⁵ .................. F01B 31/10; B23P 15/10
[52] U.S. Cl. .................. 92/155; 29/888.48
[58] Field of Search .............. 92/155, 175, 240, 242, 92/248, 249; 29/527.2, 888.048; 427/425

[56] References Cited

U.S. PATENT DOCUMENTS

| | | | |
|---|---|---|---|
| 2,961,278 | 11/1960 | Newhall | 92/206 |
| 3,272,132 | 9/1966 | Stoelting et al. | 92/164 X |
| 3,474,710 | 10/1969 | Stryker | 92/164 X |
| 3,617,349 | 11/1971 | Prasse | 427/425 |
| 4,337,687 | 7/1982 | Hoover | 92/164 X |
| 4,376,472 | 3/1983 | Heyer et al. | 92/248 X |
| 4,428,276 | 1/1984 | Loveless | 92/249 |
| 4,519,119 | 5/1985 | Nakayama et al. | 29/888.048 |

FOREIGN PATENT DOCUMENTS

| | | | |
|---|---|---|---|
| 1162440 | 9/1958 | France | 92/155 |
| 2041153 | 9/1980 | United Kingdom | 92/155 |

OTHER PUBLICATIONS

Sietzinger, Ronald C. "Coatings That Cut Friction." in *Machine Design* vol. 48, No. 24 Oct. 21, 1976, pp. 114–119.

*Primary Examiner*—Edward K. Look
*Assistant Examiner*—F. Daniel Lopez
*Attorney, Agent, or Firm*—Ralph Bailey

[57] ABSTRACT

A piston and method of manufacture is disclosed wherein a low friction plastic material D is sprayed upon a molded cylindrical metallic member, having a single intermediate annular groove C, forming a coating having wear surfaces A and B on each side of the groove, and a sealing ring E carried in the annular groove.

3 Claims, 2 Drawing Sheets

PISTON AND METHOD OF MANUFACTURE

This application is a continuation of application Ser. No. 07/568,223, filed Aug. 16, 1990.

BACKGROUND OF THE INVENTION

This invention relates to a piston for use in a cylinder having a piston rod fixed in axial relation thereto having annular wear surfaces on each side of a groove carrying a sealing ring.

Prior art piston assemblies such as those illustrated in U.S. Pat. No. 4,167,134 issued to Yuda, typically require only a wear ring to adequately reduce friction because of slower operating speeds and less demanding loads. However, the application of wear rings to a compact piston is an arduous process contributing significantly to the overall cost of the piston. Therefore, a less costly technique for reducing friction in a compact hydraulically operated piston is desirable.

According to the prior art, pistons have been supplied with Teflon wear rings and a rubber O-ring and the like in spaced relation thereto. Problems have been encountered in the manufacture due to the necessity of softening the Teflon ring before application thereof to the cylinder requiring boiling in oil to accomplish placement of the wear ring. Due to the necessity of utilizing an additional O-ring for purposes of sealing, the outer surfaces of the cylinder are of limited area. Furthermore, the extent of the wear surface provided by the Teflon ring is limited. As a result of side load friction upon the piston, galling and other damage to the bore of the cylinder results from contact by the piston therewith. An attempt to solve this problem is disclosed in U.S. Pat. No. 4,067,093 which contemplates disposing spaced molded wear members with a machined groove therebetween for placement of a sealing assembly therebetween. Many complicated manufacturing operations including molding and machining add to the expense, and the molded material is of limited effectiveness as a wear surface. Other U.S. patents dealing with the coating of a piston include U.S. Pat. Nos. 2,817,562, 3,890,950 and 4,724,819.

Accordingly, it is an important object of this invention to provide a piston for use in a cylinder assembly and having a piston rod fixed in axial relation thereto, which is of greatly reduced cost and which possesses superior wear characteristics.

Another important object of the invention is to provide a simplified method of manufacture for a piston having a piston rod fixed in axial relation thereto wherein improved wear characteristics are imparted thereto with improved performance of a cylinder assembly with which it is used.

Another object of the invention is to eliminate the usual wear ring with its difficulty of application, and to provide increased wear surface area.

SUMMARY OF THE INVENTION

A piston is provided with a low friction plastic material having been sprayed and hardened in situ providing first and second annular wear surfaces carrying a molded annular groove therebetween for carrying a sealing ring in the groove between the spaced wear surfaces.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a piston for use in a cylinder having a piston rod fixed thereto, and a source of fluid pressure in the cylinder for operating the piston. A molded cylindrical metallic member, preferably of aluminum, has an axial bore therein for receiving the piston rod. A first annular surface A' forms one end portion of the cylindrical member. A second annular surface B' forms the other end portion of the cylindrical member. A molded annular groove C in the cylindrical member is intermediate the first and second annular surfaces. A low friction plastic material D having been sprayed and hardened in situ is carried upon the first and second annular surfaces and within the annular groove forming a coating defining wear surfaces A and B respectively on the first and second annular surfaces. A sealing ring E is carried by the coating in the annular groove forming a seal for the piston when carried within a cylinder.

Figure 1:
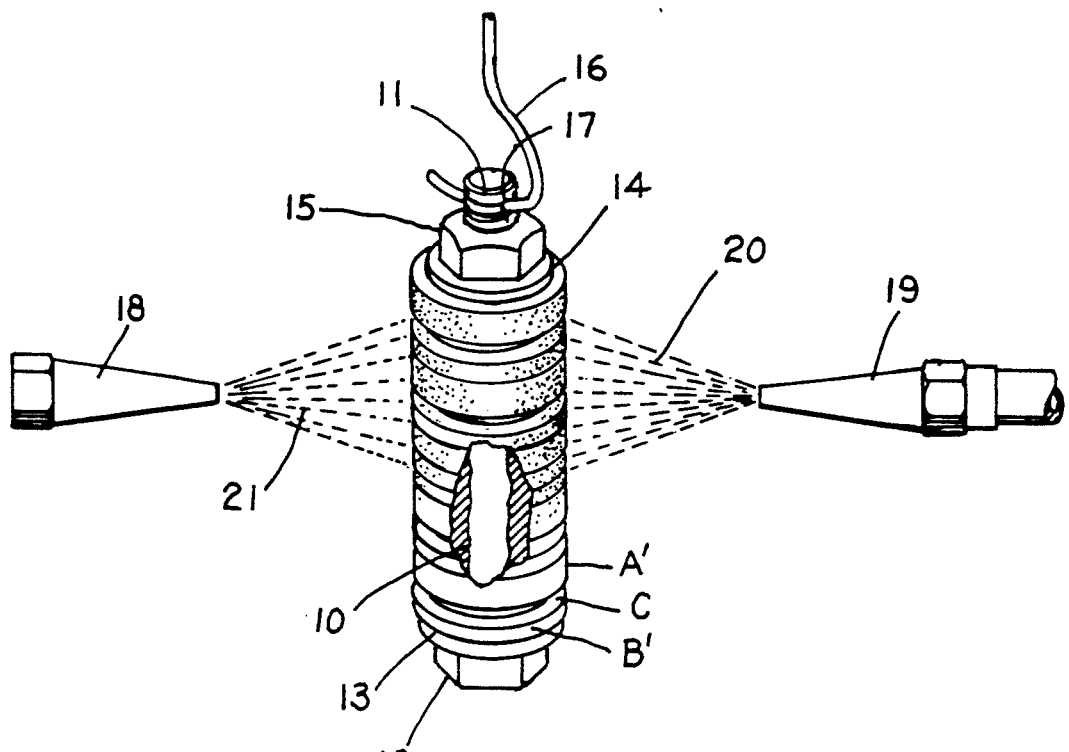
FIG. 1 is a perspective view illustrating a plurality of cylindrical metallic members suspended for treatment of outer surfaces of the respective cylindrical metallic members as by sand blasting for preparing the surfaces for application of a low friction material as by spraying thereon.
Figure 2:
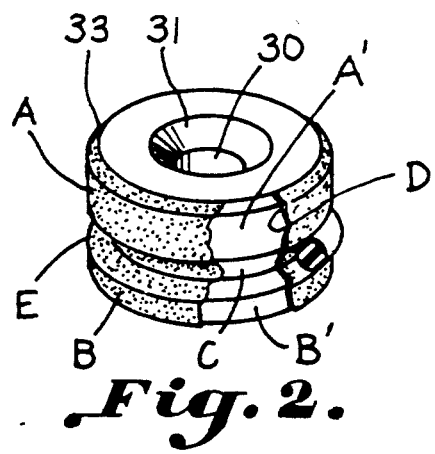
FIG. 2 is a perspective view illustrating a piston constructed in accordance with the invention.

Referring more particularly to FIG. 1, a suitable treatment is illustrated for preparing the outer surfaces of the cylinders defined by the annular surfaces forming the respective end portions and the intermediate grooves. A plurality of cylindrical metallic members are suspended upon a rod 10 having threaded portions 11 at each end. A nut 12 positions a washer 13 at the bottom for securing the stacked cylinder members at a lower end while a washer 14 and nut 15 secure cylindrical members in stacked relation for suspension upon a carrier 16 which passes through a transverse opening 17 at an upper threaded end 11 of the rod 10. A pair of nozzles 18 and 19 are illustrated as supplying opposed sprays 20 and 21 of glass beads or other suitable abrasive material. As an alternative, the cylindrical members may be tumbled or otherwise suitably abraded or chemically treated to facilitate application of the sprayed coating thereto. The roughening of the surfaces as by spray treating or tumbling or the chemical treatment facilitates the bonding of the sprayed coating to the molded metallic piston member.

Figure 4:
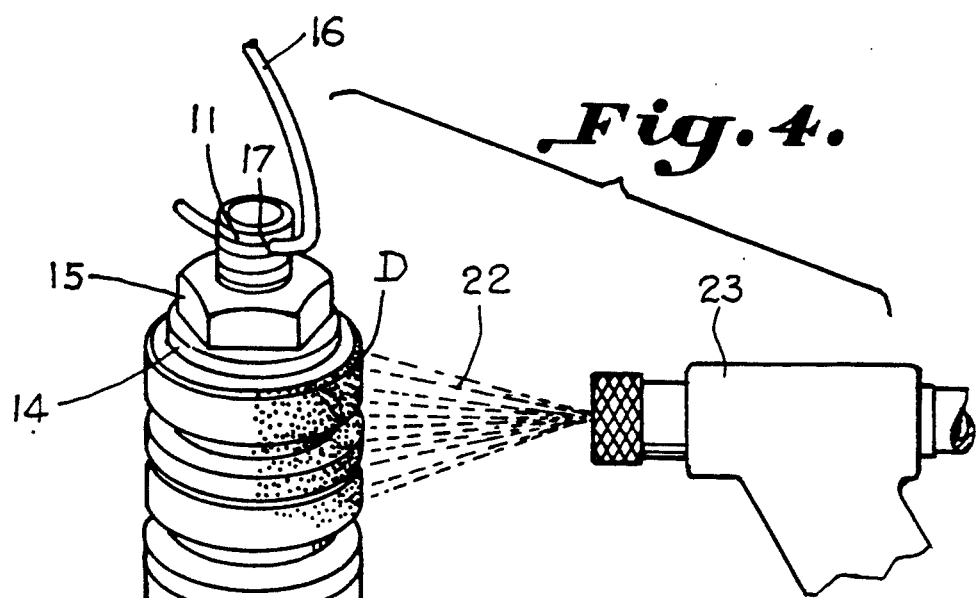
FIG. 4 is a perspective view illustrating the plurality of cylinders treated as illustrated in FIG. 1 with a spray coating of low friction material being applied thereto.

After the application of the sprayed coating which may be of Teflon powder or other material, the coated pistons are baked in an oven. The sprayed Teflon powder is illustrated at 22 in FIG. 4 and is applied as a spray from a suitable applicator 23.

Figure 5:
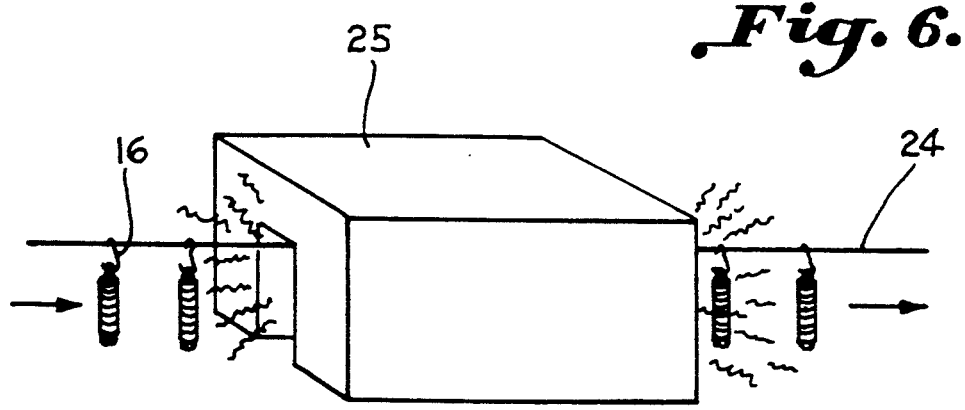
FIG. 5 illustrates a heat treatment for application to the cylinders whereon the sprayed coating has been applied.

FIG. 5 illustrates the stacks of cylindrical members suspended from the carrier 16 upon a conveyor 24 passing through a suitable oven 25.

Figure 6:
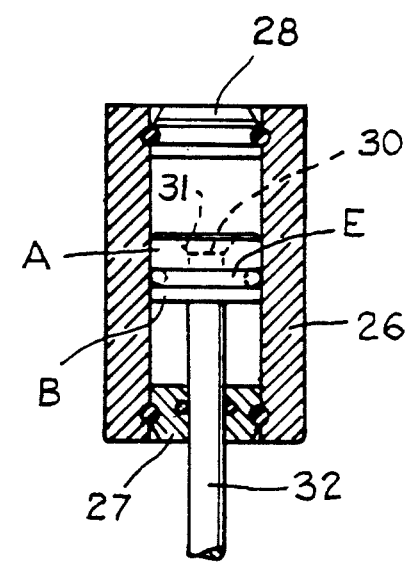
FIG. 6 is a cylinder assembly utilizing a piston constructed in accordance with the present invention.

FIG. 6 illustrates a piston constructed in accordance with the present invention carried within a cylinder 26 forming a cylinder assembly which includes end caps 27 and 28. The cylindrical member has an axial bore 30 therein and the usual tapered surface 31. The bore 30 axially receives a piston rod 32 fixed therein.

Preferably, space is provided between the washer 14 and the upper cylindrical member of the stacks of cylindrical members so that after treatment the end of the rod 10 may be struck as by applying a blow to the nut 12 to break loose each of the respective cylindrical members from the coating which may extend therebetween. Preferably, two or three coats of low friction material having thickness of approximately 0.001 inches are applied. More than two coatings appear to be unnecessary. A chamfer is provided on each edge of the groove C so that the groove tapers into the wear surfaces. Each end of the cylindrical members is illustrated as utilizing a taper 33 to provide for increased accuracy and to facilitate breaking of the bond by the cylindrical member formed during coating.

Figure 3:
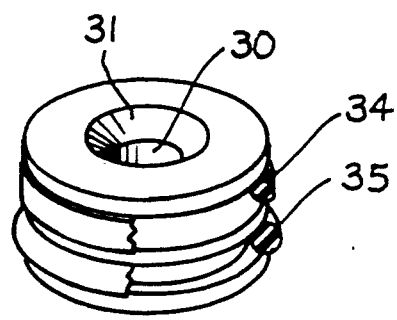
FIG. 3 is a perspective view illustrating a piston constructed in accordance with the prior art.

Pistons manufactured in accordance with the present invention are an improvement of the prior art illustrated in FIG. 3 which utilizes a Teflon wear ring 34 and a spaced rubber O-ring 35.

It is thus seen that an inexpensive piston manufactured in accordance with a greatly simplified method, having improved wear characteristics is provided.

While a preferred embodiment of the invention has been described using specific terms, such description is for illustrative purposes only, and it is to be understood that changes and variations may be made without departing from the spirit or scope of the following claims.

What is claimed is:

1. The method of manufacturing a piston having a cylindrical outer wear surface on each side of an annular groove and an axial bore therethrough for receiving a piston rod comprising the steps of:
   suspending a plurality of cylindrical metallic members in stacked relation upon a rod passing through respective axial bores of said cylindrical metallic members;
   treating an outer surface of each of said cylindrical metallic members, each of said members including said surfaces and said annular groove, for receiving a spray of plastic material;
   spraying said plastic material on said outer surface after so treating said outer surface and while so suspending said cylindrical members in stacked relation upon said rod forming a coating defining spaced wear surfaces; and
   hardening in situ said plastic material on said outer surface while so suspending said cylindrical members in said stacked relation upon said rod.

2. The method set forth in claim 1 wherein said treating is by roughening, and wherein said hardening is by baking.

3. The method set forth in claim 2 including the steps of tapering edge portions of said wear surfaces, treating said edge portions, spraying said plastic material on said edge portions, and separating said metallic members after hardening.

* * * * *